United States Patent [19]

Wilson

[11] Patent Number: 5,370,851
[45] Date of Patent: Dec. 6, 1994

[54] CRYSTALLINE SILICOALUMINO PHOSPHATES: SAPO-36 AND SAPO-56

[75] Inventor: Stephen T. Wilson, Shrub Oak, N.Y.

[73] Assignee: UOP, Des Plaines, Ill.

[21] Appl. No.: 67,883

[22] Filed: May 27, 1993

[51] Int. Cl.$^5$ .................. C01B 25/12; C01B 33/12
[52] U.S. Cl. .................. 423/305; 423/327.1; 502/214
[58] Field of Search .................. 423/705, 327.1, 305; 502/214

[56] References Cited

U.S. PATENT DOCUMENTS

| | | | |
|---|---|---|---|
| 4,061,724 | 12/1977 | Grose et al. | 423/335 |
| 4,310,440 | 1/1982 | Wilson et al. | 252/435 |
| 4,440,871 | 4/1984 | Lok et al. | 502/214 |
| 4,853,197 | 8/1989 | Wilson et al. | 423/305 |
| 4,880,761 | 11/1989 | Bedard et al. | 502/215 |
| 5,124,136 | 6/1992 | Davis | 423/705 |
| 5,169,614 | 12/1992 | Chang et al. | 502/77 |
| 5,227,151 | 7/1993 | Calabro | 423/703 |
| 5,232,683 | 8/1993 | Clark et al. | 423/708 |

*Primary Examiner*—Anthony McFarlane
*Attorney, Agent, or Firm*—Thomas K. McBride; Eugene I. Snyder; Frank S. Molinaro

[57] ABSTRACT

This invention relates to novel silicoaluminophosphate molecular sieves. These sieves are represented by the empirical formula:

$$mR:(Si_xAl_yP_z)O_2$$

where R represents at least one organic templating agent present in the intracrystalline pore system; m is the molar amount of R per mole of $(Si_xAl_yP_z)O_2$ and has a value from zero to about 0.3; x is the mole fraction of silicon and varies from about 0.01 to about 0.98, y is the mole fraction of aluminum and varies from about 0.01 to about 0.60, z is the mole fraction of phosphorus and varies from about 0.01 to about 0.52 and $x+y+z=1$. These sieves have the structure of SAPO-36 or SAPO-56 and are useful as hydrocarbon conversion processes.

8 Claims, No Drawings

CRYSTALLINE SILICOALUMINO PHOSPHATES: SAPO-36 AND SAPO-56

FIELD OF THE INVENTION

This invention relates to two new species of crystalline microporous silicoalumino phosphate molecular sieves, to their method of preparation and to their use as adsorbents and catalysts. The species are identified as SAPO-36 and SAPO-56 and are prepared hydrothermally from gels containing reactive sources of phosphorus, silicon, aluminum, and organic templating agents and water.

BACKGROUND OF THE INVENTION

Zeolites are crystalline aluminosilicate molecular sieves which have a microporous three-dimensional framework structure. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Zeolites can be represented on an anhydrous basis, by the empirical formula

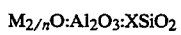
$$M_{2/n}O:Al_2O_3:XSiO_2$$

where M is a cation having the valence n, X is generally equal to or greater than 2. In naturally occurring zeolites, M can be Li, Na, Ca, K, Mg and Ba. The M cations are loosely bound to the structure and frequently can be completely or partially replaced with other cations by conventional ion exchange techniques. Currently over 150 species of both naturally occurring and synthetic zeolites are known.

Other crystalline microporous compositions are known which are not zeolitic, i.e., do not contain $AlO_2$ tetrahedra as essential framework constituents, but which exhibit the ion-exchange and/or adsorption characteristics of the zeolites. These include 1) a pure silica polymorph, silicalite, having a neutral framework containing neither cations nor cation sites as disclosed in the U.S. Pat. No. 4,061,724; 2) crystalline aluminophosphate compositions disclosed in U.S. Pat. No. 4,310,440; 3) silicon substituted aluminophosphates as disclosed in U.S. Pat. No. 4,440,871; 4) metal substituted aluminophosphates as disclosed in U.S. Pat. No. 4,853,197; and 5) metal sulfide molecular sieves disclosed in U.S. Pat. No. 4,880,761.

U.S. Pat. No. 4,440,871 discloses a class of silicoalumino phosphates which are identified by the acronym SAPO and which have different structures as identified by their x-ray diffraction pattern. The structures are identified by a numerical number after SAPO. Thus, the '871 reference discloses the preparation of SAPO-5, SAPO-11, SAPO-16, SAPO-17, SAPO-20, SAPO-34, SAPO-35, SAPO-37, SAPO-40, SAPO-42, SAPO-44, SAPO-31, and SAPO-41. Applicant has synthesized two new species in the SAPO family, namely SAPO-36 and SAPO-56. Although the 36 structure has been synthesized in the MeAPO and the MeAPSO families, where Me is magnesium, zinc, manganese or cobalt, there are no known reports of the 36 structure being synthesized in the SAPO family. Applicant is thus the first to synthesize the 36 and 56 structures in the SAPO family. Both of these structures are observed to have unique adsorptive and catalytic properties as will be discussed in more detail herein.

SUMMARY OF THE INVENTION

As stated, applicant has discovered two new silicoalumino phosphate species, methods of preparing them and processes using these novel compositions. Accordingly, one embodiment of the invention is a crystalline molecular sieve having a three-dimensional microporous framework of $SiO_2$, $AlO_2$, and $PO_2$ tetrahedral units, having an intracrystalline pore system and an empirical formula expressed in molar ratios:

$$mR:(Si_xAl_yP_z)O_2$$

where R represents at least one organic templating agent present in the intracrystalline pore system; m is the molar amount of R per mole of $(Si_xAl_yP_z)O_2$ and has a value from zero to about 0.3; x is the mole fraction of silicon and varies from about 0.01 to about 0.98, y is the mole fraction of aluminum and varies from about 0.01 to about 0.60, z is the mole fraction of phosphorus and varies from about 0.01 to about 0.52 and $x+y+z=1$, the molecular sieve characterized in that it has an x-ray diffraction pattern that contains at least the d-spacings set forth in Tables A or B:

TABLE A (SAPO-36)

| 2θ | D(Å) | Relative Intensity |
|---|---|---|
| 7.88 | 11.22 | vs |
| 13.55 | 6.54 | w |
| 15.84 | 5.59 | w |
| 16.41 | 5.40 | m |
| 19.07 | 4.65 | m |
| 20.81 | 4.27 | m |
| 21.98 | 4.04 | m |
| 22.40 | 3.97 | m |
| 23.91 | 3.72 | w |
| 24.26 | 3.67 | w |
| 27.53 | 3.24 | w |
| 27.81 | 3.21 | w |
| 28.8 | 3.10 | w |
| 30.2 | 2.96 | w |
| 34.8 | 2.58 | w-m |

TABLE B (SAPO-56)

| 2θ | D(Å) | Relative Intensity |
|---|---|---|
| 7.27 | 12.16 | m |
| 8.49 | 10.41 | vs |
| 11.41 | 7.76 | s |
| 12.73 | 6.95 | m |
| 14.75 | 6.01 | w |
| 15.11 | 5.86 | w |
| 15.42 | 5.75 | m |
| 17.21 | 5.15 | m |
| 17.59 | 5.04 | s |
| 20.09 | 4.42 | s |
| 21.53 | 4.13 | s |
| 21.86 | 4.07 | m |
| 23.34 | 3.81 | m |
| 25.81 | 3.45 | m |
| 27.67 | 3.22 | m-s |
| 28.36 | 3.15 | w |
| 29.83 | 3.00 | m |
| 30.26 | 2.95 | m |
| 30.64 | 2.92 | w |
| 31.27 | 2.86 | m |

TABLE B-continued
(SAPO-56)

| 2θ | D(Å) | Relative Intensity |
|---|---|---|
| 31.49 | 2.84 | w |
| 32.10 | 2.79 | w |
| 33.34 | 2.69 | m |
| 34.43 | 2.60 | w |
| 42.64 | 2.12 | w |
| 43.34 | 2.09 | w |
| 45.91 | 1.98 | w |
| 46.79 | 1.94 | w |
| 47.63 | 1.91 | w |
| 49.77 | 1.83 | w |
| 50.56 | 1.81 | w |
| 50.68 | 1.80 | w |
| 53.20 | 1.72 | w |
| 53.35 | 1.72 | w |

Another embodiment of the invention is a process for preparing a crystalline molecular sieve having a three-dimensional microporous framework of $SiO_2$, $AlO_2$, and $PO_2$ tetrahedral units, having an intracrystalline pore system, an empirical formula expressed in molar ratios:

$$mR:(Si_xAl_yP_z)O_2$$

where R represents at least one organic templating agent present in the intracrystalline pore system; m is the molar amount of R per mole of $(Si_xAl_yP_z)O_2$ and has a value from zero to about 0.3; x is the mole fraction of silicon and varies from about 0.01 to about 0.98, y is the mole fraction of aluminum and varies from about 0.01 to about 0.60, z is the mole fraction of phosphorus and varies from about 0.01 to about 0.52 and x+y+z=1, and an x-ray diffraction pattern characteristic of SAPO-36; the process comprising forming a reaction mixture having a composition expressed by the formula:

$$aR:(Si_uAl_vP_w)O_2:bH_2O$$

where R is an organic templating agent selected from the group consisting of tripropylamine, dimethylbenzylamine, and tetrapropylammonium hydroxide; a has a value from greater than 0 to about 6; b has a value from 0 to 500, preferably 2 to 30; u is the mole fraction of silicon and varies from about 0.01 to about 0.98; v is the mole fraction of aluminum and varies from about 0.01 to about 0.98; w is the mole fraction of phosphorus and varies from about 0.01 to about 0.98; and reacting the mixture at a temperature of about 100° C. to about 250° C. under autogenous pressure for a time of about 2 hours to 2 weeks, thereby producing said crystalline molecular sieve.

A further embodiment of the invention is a process for preparing a crystalline molecular sieve having a three-dimensional microporous framework of $SiO_2$, $AlO_2$, and $PO_2$ tetrahedral units, having an intracrystalline pore system, an empirical formula expressed in molar ratios:

$$mR:(Si_xAl_yP_z)O_2$$

where R represents at least one organic templating agent present in the intracrystalline pore system; m is the molar amount of R per mole of $(Si_xAl_yP_z)O_2$ and has a value from zero to about 0.3; x is the mole fraction of silicon and varies from about 0.01 to about 0.98, y is the mole fraction of aluminum and varies from about 0.01 to about 0.60, z is the mole fraction of phosphorus and varies from about 0.01 to about 0.52 and x+y+z=1, and an x-ray diffraction pattern characteristic of SAPO-56; the process comprising forming a reaction mixture having a composition expressed by the formula:

$$aR:(Si_uAl_vP_w)O_2:bH_2$$

where R is N,N,N'N'-tetramethylhexane-1,6-diamine; a has a value from greater than 0 to about 6; b has a value from 0 to 500, preferably 2 to 30; u is the mole fraction of silicon and varies front about 0.01 to about 0.98; v is the mole fraction of aluminum and varies from about 0.01 to about 0.98; w is the mole fraction of phosphorus and varies from about 0.01 to about 0.98; and reacting the mixture at a temperature of about 100° C. to about 250° C. under autogenous pressure for a time of about 2 hours to 2 weeks, thereby producing said crystalline molecular sieve.

Yet another embodiment of the invention is a process for converting a hydrocarbon to a hydroconverted product comprising contacting a hydrocarbon under hydrocarbon conversion conditions with a crystalline molecular sieve as described above.

These and other objects and embodiments of the invention will become more apparent after a more detailed description of the invention.

DETAILED DESCRIPTION OF THE INVENTION

As stated, the instant invention relates to a crystalline silicoalumino phosphate molecular sieve, a process for preparing the molecular sieve and processes using the molecular sieve. A hydrothermal process is used to prepare the SAPO-56 and SAPO-36 molecular sieves. This hydrothermal process involves forming a reaction mixture which in terms of molar ratios of the oxides is expressed by the formula:

$$aR:(Si_uAl_vP_w)O_2:bH_2$$

where R is an organic templating agent; a has a value from greater than 0 to about 6, b has a value from 0 to 500, preferably 2 to 30; u is the mole fraction of silicon and varies from about 0.01 to about 0.98; v is the mole fraction of aluminum and varies from about 0.01 to about 0.98; w is the mole fraction of phosphorus and varies from about 0.01 to about 0.98. Accordingly, one necessary component of the reaction mixture is an organic templating agent which is selected from the group consisting of tripropylamine, dimethylbenzylamine (DMBA), N,N,N',N'-tetramethylhexane-1,6-diamine (TMHD) and tetrapropylammonium hydroxide. As will be shown in the examples, tripropylamine, DMBA and tetrapropylammonium hydroxide give the SAPO-36 structure, while TMHD gives the SAPO-56 structure. The reactive source of phosphorus can be any of the phosphorus acids or phosphorus oxides, phosphates and phosphites. Specific examples of the phosphorus sources which can be used in this invention are orthophosphoric acid, pyrophosphoric acid, alkali phosphates and sodium metaphosphate. The aluminum source can be an aluminum alkoxide, pseudoboehmite, gibbsite, sodium aluminate, aluminum trichloride, aluminum chlorohydrate and crystalline amorphous aluminophosphates. Preferred sources are pseudoboehmite and aluminum alkoxides such as aluminum isopropoxide. Finally, reactive sources of silicon include silica sol, fumed silica, amorphous precipitated silica, silica gel, silicon alkoxide, silicic acid, or alkali metal silicates. Of these silica sol and fumed silica are preferred.

Having formed the reaction mixture it is now placed in a sealed pressure vessel, preferably lined with an inert plastic material such as polytetrafluoroethylene and heated, preferably under autogenous pressure at a temperature of at least about 100° C. and preferably between 100° C. and 250° C. until crystals of the silicoalumino phosphate 36 or 56 structure are obtained, which period is usually from about 2 hours to 2 weeks. While not essential it has been found that in general stirring or other moderate agitation of the reaction mixture and/or seeding the reaction mixture with seed crystals of the same structure facilitates the crystallization procedure.

After crystallization the SAPO product is isolated and washed with water and dried in air. The as-synthesized sample contains within its internal pore system at least some of the templating agent employed in its formation. Most commonly the organic moiety is an occluded molecular species, but it is possible that at least some of the templating agent is present as a charge balancing cation. As a general rule the templating agent is too large to move freely through the pore system of the sample product and must be removed by calcining the SAPO-36 or -56 material at temperatures of about 200° to 700° C. to thermally degrade the organic species.

The as-synthesized SAPO-36 and 56 molecular sieves obtained from the above procedure have the empirical formula expressed in molar ratios:

$$mR:(Si_xAl_yP_z)O_2$$

where R represents at least one organic templating agent present in the intracrystalline pore system; m is the molar amount of R per mole of $(Si_xAl_yP_z)O_2$ and has a value from zero to about 0.3; x is the mole fraction of silicon and varies from about 0.01 to about 0.98, y is the mole fraction of aluminum and varies from about 0.01 to about 0.60, z is the mole fraction of phosphorus and varies from about 0.01 to about 0.52 and $x+y+z=1$.

The structures of the SAPO-36 and 56 molecular sieves of this invention were identified by powder x-ray diffraction analysis. The x-ray patterns were obtained using standard x-ray powder diffraction techniques. The radiation source was a high-intensity, copper target, x-ray tube operated at 50 Kv and 40 ma. The diffraction pattern from the copper K-alpha radiation and graphite monochromator can be suitably recorded by an x-ray spectrometer scintillation counter, pulse height analyzer and strip chart recorder. Flat compressed powder samples were scanned at 2θ (2 theta) per minute, using a two-second time constant. Interplanar spacings (d) in Angstrom units were obtained from the position of the diffraction peaks expressed as 2θ where θ is the Bragg angle as observed on the strip chart. Intensities were determined from the heights of diffraction peaks after subtracting background, "$I_o$" being the intensity of the strongest line or peak, and "I" being the intensity of each of the other peaks.

Alternatively, the x-ray patterns can be obtained from the copper K-alpha radiation by use of computer based techniques using a Siemens D-500 x-ray powder diffractometer, Siemens Type K-805 x-ray sources, available from Siemens Corporation, Cherry Hill, N.J., with appropriate computer interface.

As will be understood by those skilled in the art, the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of $100 \times I/I_o$, the above designations are defined as $w=0-15$; $m=15-60$; $s=60-80$ and $vs=80-100$.

The SAPO-36 of this invention has an x-ray diffraction pattern that contains at least d-spacings set forth in Table A.

TABLE A

| (SAPO-36) | | |
|---|---|---|
| 2θ | D(Å) | Relative Intensity |
| 7.88 | 11.22 | vs |
| 13.55 | 6.54 | w |
| 15.84 | 5.59 | w |
| 16.41 | 5.40 | m |
| 19.07 | 4.65 | m |
| 20.81 | 4.27 | m |
| 21.98 | 4.04 | m |
| 22.40 | 3.97 | m |
| 23.91 | 3.72 | w |
| 24.26 | 3.67 | w |
| 27.53 | 3.24 | w |
| 27.81 | 3.21 | w |
| 28.8 | 3.10 | w |
| 30.2 | 2.96 | w |
| 34.8 | 2.58 | w-m |

The SAPO-56 molecular sieve of this invention has the x-ray diffraction pattern that contains at least the d-spacings set forth in Table B.

TABLE B

| (SAPO-56) | | |
|---|---|---|
| 2θ | D(Å) | Relative Intensity |
| 7.27 | 12.16 | m |
| 8.49 | 10.41 | vs |
| 11.41 | 7.76 | s |
| 12.73 | 6.95 | m |
| 14.75 | 6.01 | w |
| 15.11 | 5.86 | w |
| 15.42 | 5.75 | m |
| 17.21 | 5.15 | m |
| 17.59 | 5.04 | s |
| 20.09 | 4.42 | s |
| 21.53 | 4.13 | s |
| 21.86 | 4.07 | m |
| 23.34 | 3.81 | m |
| 25.81 | 3.45 | m |
| 27.67 | 3.22 | m-s |
| 28.36 | 3.15 | w |
| 29.83 | 3.00 | m |
| 30.26 | 2.95 | m |
| 30.64 | 2.92 | w |
| 31.27 | 2.86 | m |
| 31.49 | 2.84 | w |
| 32.10 | 2.79 | w |
| 33.34 | 2.69 | m |
| 34.43 | 2.60 | w |
| 42.64 | 2.12 | w |
| 43.34 | 2.09 | w |
| 45.91 | 1.98 | w |
| 46.79 | 1.94 | w |

TABLE B-continued

| | (SAPO-56) | |
|---|---|---|
| 2θ | D(Å) | Relative Intensity |
| 47.63 | 1.91 | w |
| 49.77 | 1.83 | w |
| 50.56 | 1.81 | w |
| 50.68 | 1.80 | w |
| 53.20 | 1.72 | w |
| 53.35 | 1.72 | w |

The crystalline SAPO-36 and 56 materials of this invention are capable of separating mixtures of molecular species based on the molecular size (kinetic diameters) or on the degree of polarity of the molecular species. When the separation of molecular species is based on molecular size, the crystalline microporous material is chosen in view of the dimensions of its pores such that at least the smallest molecular species of the mixture can enter the intracrystalline void space while at least the largest species is excluded. The kinetic diameters of various molecules such as oxygen, nitrogen, carbon dioxide, carbon monoxide are provided in D. W. Breck, ZEOLITE MOLECULAR SIEVES, John Wiley and Sons (1974) p. 636.

When the separation is based on degree of polarity, it is generally the case that the more hydrophilic crystalline material of this invention will preferentially adsorb the more polar molecular species of a mixture having different degrees of polarity even though both molecular species can communicate with the pore system of the crystalline material. For example water, which is more polar, will be preferentially adsorbed over common hydrocarbon molecules such as paraffins, olefins, etc. Thus, the crystalline materials of this invention can be used as desiccants in such adsorption separation/purification processes as natural gas drying, cracked gas drying, etc.

If one of the molecular species, e.g., water, is a small impurity, the separation may be effected in the conventional manner by simply passing the stream to be treated through a bed of the particular crystalline material desired. As the operation of the process continues, there develops in a bed a so-called "front" between the material loaded with the impurity, e.g., water, and the material not so loaded. This front moves through the bed in the direction of gas flow. Before the front reaches the downstream end of the bed, the bed is regenerated by cutting off the flow of feed stream and passing through the bed a purge gas which (usually at a temperature of about 50°-150° C.) desorbs the impurity, e.g., water, from the bed. If the purge gas is adsorbed on the bed, this gas can be removed by passing one or two bed volumes of the feed stream through the bed.

If the concentration of one of the species in the mixture is large, e.g., several percents, other conventional techniques, such as pressure swing adsorption (PSA) and thermal swing adsorption may be used. Such techniques are well known to those skilled in the separation art. See, e.g., U.S. Pat. Nos. 4,723,966, 4,589,888 and 4,398,926. For example, a pressure swing adsorption process will operate at a temperature and pressure sufficient to effect the adsorption and desorption of the component or molecular specie which one wants to remove. Typically the temperature is preferably maintained in the range of about −50° to 100° C. and preferably from about 0° to 50° C. The pressure during adsorption can vary from about 0.2 psia (1.4 kPa) to about 1500 psia (10,342 kPa), preferably frown about 50 psia (344 kPa) to about 500 psia (3,447 kPa) and more preferably from about 75 psia (517 kPa) to about 350 psia (2,413 kPa). The pressure during desorption is lower than during adsorption and effective to cause desorption of the adsorbed component. The range of this pressure is from about 0.1 torr (1.3 Pa) to 150 psia (1,034 kPa), preferably from about 0.1 tort (1.3 Pa) to 15 psia (103 kPa) and more preferably from about 0.1 torr (1.3 Pa) to about 250 torr (333 Pa). The cyclic process can comprise additional adsorption and regeneration steps as well as intermediate depressurization and purging steps.

The crystalline microporous compositions of the present invention either as synthesized or after calcination can be used as catalysts or catalyst supports in a hydrocarbon conversion process. Hydrocarbon conversion processes are well known in the art and include cracking, hydrocracking, alkylation of both aromatics and isoparaffins, isomerization, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. Nos. 4,310,440 and 4,440,871 which are incorporated by reference. Preferred hydrocarbon conversion processes are those in which hydrogen is a component such as hydrotreating or hydrofining, hydrogenation, hydrocracking, hydrodenitrogenation, hydrodesulfurization, etc.

The following examples are set forth in illustration of the invention. It is to be understood that the examples are only by way of illustration and are not intended as an undue limitation on the broad scope of the invention as set forth in the appended claims.

EXAMPLE 1

Aluminum chlorhydrate (obtained as 50% solution from Reheis as Chlorhydrol ®), fumed silica (obtained from Cabot as Cabosil ® and identified as EH5), 85% orthophosphoric acid (Fisher Scientific), and tripropyl amine (Aldrich, $Pr_3N$) were used to prepare a reaction mixture having the following composition expressed as molar oxide ratios:

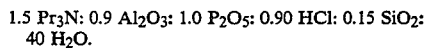

1.5 $Pr_3N$: 0.9 $Al_2O_3$: 1.0 $P_2O_5$: 0.90 HCl: 0.15 $SiO_2$: 40 $H_2O$.

Mix A: Aluminum chlorhydrate (65.3 g) was diluted in 34.6 g distilled water, and fumed silica (1.6 g) was blended in. Mix B: Orthophosphoric acid (38.4 g) was diluted with 25.6 g distilled water, 35.5 g of tripropylamine was added, and the resulting mixture was stirred until most of the amine was dissolved in the aqueous acid. Mix A was then slowly added to mix B with vigorous agitation (some thickening occurred). Finally, MAPO-36 seed crystals (2.0 g, equivalent to 5% by weight of the oxides in the reaction mixture) were blended in prior to crystallization.

The resultant mixture was heated under autogenous pressure at 150° C. for 72 hours. After cooling, the product was recovered by filtration, washed and dried. This product designated SAPO-36 had the characteristic x-ray diffraction pattern found in Table A. Elemental analysis of the product as synthesized gave (wt %): $Al_2O_3$ 32.7, $P_2O_5$ 48.1, $SiO_2$ 2.28, C 8.13, N 0.94, and Loss on Ignition (1000° C.) 15.9.

EXAMPLE 2

Pseudoboehmite alumina (Larox Versal® 250, 65 wt % Al$_2$O$_3$), colloidal silica (Ludox® LS, 30 wt % SiO$_2$), 85% orthophosphoric acid, tripropyl amine (Pr$_3$N) and water were mixed to give a reaction mixture having the following composition expressed as molar oxide ratios:

1.5 Pr$_3$N: 1.0 Al$_2$O$_3$: 0.9 P$_2$O$_5$: 0.6 SiO$_2$: 40 H$_2$O.

Mix A: Versal® 250 hydrated alumina (39.2 g) and Ludox® LS (28.8 g) were alternately added in small portions to 63.1 g distilled water with constant mixing (magnetic stirring). Mix B: Ortho-phosphoric acid (52.0 g) was diluted with 63.1 g distilled water; 53.8 g of tripropylamine was added, and the resulting mixture was stirred until most of the amine was dissolved in the aqueous acid. Mix A was then slowly added to mix B with vigorous agitation. Finally MAPO-36 seed crystals (6.6 g, equivalent to 10% by weight of the oxides in the reaction mixture) were blended in prior to crystallization.

The resultant mixture was heated under autogenous pressure at 150° C. for 72 hours. After cooling, the product was recovered by filtration, washed and dried. This product had the characteristic x-ray diffraction pattern found in Table A.

EXAMPLE 3

Pseudoboehmite alumina, fumed silica, 85% orthophosphoric acid, N,N-dimethylbenzylamine (DMBA) and water were mixed to form a reaction mixture having the following composition expressed as molar oxide ratios:

2.0 DMBA: 1.0 Al$_2$O$_3$: 0.9 P$_2$O$_5$: 0.15 SiO$_2$: 40 H$_2$O.

Mix A: Versal® 250 hydrated alumina (38.3 g) was diluted in 91.7 g distilled water, and Cabosil TM -EH5 fumed silica (2.3 g) was blended in. Mix B: Orthophosphoric acid (50.9 g) was diluted with 51.0 g distilled water, 66.0 g of DMBA was added, and the resulting mixture was stirred until most of the amine was dissolved in the aqueous acid. Mix B was then quickly added to mix A with vigorous agitation (some thickening occurs). Finally MAPO-36 seed crystals (2.9 g, equivalent to 5% by weight of the oxides in the reaction mixture) were blended in prior to crystallization.

This mixture was heated under autogenous pressure at 150° C. for 24 hours. After cooling the product was recovered by filtration, washed and dried. The x-ray diffraction pattern of this product showed that the main constituent was SAPO-36 although the product was not pure.

EXAMPLE 4

Pseudoboehmite alumina (Larox Versal® 250, 65% Al$_2$O$_3$), fumed silica (obtained from Cabot as Cabosil TM and identified as EH5, 95% SiO$_2$), 85% orthophosphoric acid, and N,N,N',N'-tetramethylhexane-1,6-diamine (TMHD) was used to prepare a reaction mixture with the following composition expressed as molar oxide ratios:

2.0 TMHD: 0.8 Al$_2$O$_3$: P$_2$O$_5$: 0.6 SiO$_2$: 40 H$_2$O.

Orthophosphoric acid (51.5 g) was diluted with 128.1 g distilled water. Versal® 250 alumina (35.0 g) was added in small increments to this solution with stirring. To the resulting mixture (slightly thickened) Cabosil-EH5 (8.5 g) was added in several small increments and blended in to give a thick gel. Finally 76.9 g of TMHD was added slowly. During the early stages of TMHD addition, the reaction mixture thickened considerably. After approximately ⅔ of the TMHD has been added, the mixture thinned to a pourable consistency.

This mixture was heated under autogenous pressure at 200° C. for 48 hours. After cooling the product was recovered by filtration, washed and dried. This product had the characteristic x-ray diffraction pattern of SAPO-56 found in Table B. Elemental analysis of the product as synthesized gave (wt %): Al$_2$O$_3$ 32.6, P$_2$O$_5$ 35.1, SiO$_2$ 11.3, C 10.3 N, 2.4, and Loss on Ignition (1000° C.) 20.5.

EXAMPLE 5

Pseudoboehmite alumina (Larox Versal® 250), fumed silica (Cabosil TM -EH5), 85% orthophosphoric acid, and TMHD were mixed to give a reaction mixture with the following composition expressed as molar oxide ratios:

1.0 TMHD: 1.0 Al$_2$O$_3$: 1.0 Al$_2$O$_3$: P$_2$O$_5$: 0.6 SiO$_2$: 40 H$_2$O.

Orthophosphoric acid (59.1 g) was diluted with 147.0 g distilled water. Versal® 250 alumina (40.2 g) was added in small increments to this solution with stirring. To the resulting mixture (slightly thickened) Cabosil TM -EH5 (9.7 g) was added in several small increments and blended in to give a thick gel. Finally 44.1 1g of TMHD was added slowly. During the early stages of TMHD addition, the reaction mixture thickened considerably.

This mixture was heated under autogenous pressure at 200° C. for 96 hours. After cooling the product was recovered by filtration, washed and dried. This product had the characteristic x-ray diffraction pattern of SAPO-56 found in Table B. Elemental analysis of the product as synthesized gave (wt %): Al$_2$O$_3$ 30.6, P$_2$O$_5$ 33.1, SiO$_2$ 11.6, C 10.1, N 2.3, and Loss on Ignition (1000° C.) 24.0.

EXAMPLE 6

A sample of SAPO-56 from Example 4 was heated in oxygen at a temperature of 400° C. for 20 hours to remove the occluded organic species. Adsorption capacities were measured on this calcined sample using a standard McBain-Bakr gravimetric adsorption apparatus. The data obtained from these adsorption measurements are presented in Table C.

TABLE C

| Adsorbate | Pressure, Torr | Wt % Adsorbed |
|---|---|---|
| H$_2$O | 4.6 | 31.5 |
| Oxygen | 100 | 30.2 |
| Oxygen | 700 | 35.0 |
| n-Butane | 100 | 15.2 |
| n-Butane | 700 | 16.3 |
| i-Butane | 100 | 1.3 |
| i-Butane | 750 | 2.0 |

These values are consistent with the adsorption of oxygen and n-butane and the essential exclusion of the larger isobutane.

EXAMPLE 7

A sample of SAPO-36 from Example 1 above was heated in air at a temperature of 600° C. for 2 hours to remove the occluded organic compound. The nitrogen adsorption capacity was measured on this calcined sample using a Micromeritics volumetric adsorption apparatus. The results of this experiment is presented in Table D.

TABLE D

| Adsorbate | Pressure, Torr | Wt % Adsorbed |
| --- | --- | --- |
| Nitrogen | 117 | 15 |
| Nitrogen | 728 | 20 |

I claim as my invention:

1. A crystalline molecular sieve having a three-dimensional microporous framework of $SiO_2$, $AlO_2$, and $PO_2$ tetrahedral units, having an intracrystalline pore system and an empirical formula expressed in molar ratios:

$$mR:(Si_xAl_yP_z)O_2$$

where R represents at least one organic templating agent present in the intracrystalline pore system; m is the molar amount of R per mole of $(Si_xAl_yP_z)O_2$ and has a value from zero to about 0.3; x is the mole fraction of silicon and varies from about 0.01 to about 0.98, y is the mole fraction of aluminum and varies from about 0.01 to about 0.60, z is the mole fraction of phosphorus and varies from about 0.01 to about 0.52 and $x+y+z=1$, the molecular sieve characterized in that it has an x-ray diffraction pattern that contains at least the d-spacings set forth in Tables A or B:

TABLE A

| 2θ | D(Å) | Relative Intensity |
| --- | --- | --- |
| 7.88 | 11.22 | vs |
| 13.55 | 6.54 | w |
| 15.84 | 5.59 | w |
| 16.41 | 5.40 | m |
| 19.07 | 4.65 | m |
| 20.81 | 4.27 | m |
| 21.98 | 4.04 | m |
| 22.40 | 3.97 | m |
| 23.91 | 3.72 | w |
| 24.26 | 3.67 | w |
| 27.53 | 3.24 | w |
| 27.81 | 3.21 | w |
| 28.8 | 3.10 | w |
| 30.2 | 2.96 | w |
| 34.8 | 2.58 | w-m |

TABLE B (SAPO-56)

| 2θ | D(Å) | Relative Intensity |
| --- | --- | --- |
| 7.27 | 12.16 | m |
| 8.49 | 10.41 | vs |
| 11.41 | 7.76 | s |
| 12.73 | 6.95 | m |
| 14.75 | 6.01 | w |
| 15.11 | 5.86 | w |
| 15.42 | 5.75 | m |
| 17.21 | 5.15 | m |
| 17.59 | 5.04 | s |
| 20.09 | 4.42 | s |
| 21.53 | 4.13 | s |
| 21.86 | 4.07 | m |
| 23.34 | 3.81 | m |
| 25.81 | 3.45 | m |
| 27.67 | 3.22 | m-s |
| 28.36 | 3.15 | w |
| 29.83 | 3.00 | m |
| 30.26 | 2.95 | m |
| 30.64 | 2.92 | w |
| 31.27 | 2.86 | m |
| 31.49 | 2.84 | w |
| 32.10 | 2.79 | w |
| 33.34 | 2.69 | m |
| 34.43 | 2.60 | w |
| 42.64 | 2.12 | w |
| 43.34 | 2.09 | w |
| 45.91 | 1.98 | w |
| 46.79 | 1.94 | w |
| 47.63 | 1.91 | w |
| 49.77 | 1.83 | w |
| 50.56 | 1.81 | w |
| 50.68 | 1.80 | w |
| 53.20 | 1.72 | w |
| 53.35 | 1.72 | w |

2. The molecular sieve of claim 1 characterized in that it has the x-ray powder diffraction which has at least the d-spacings set forth in Table A.

3. The molecular sieve of claim 1 characterized in that it has the x-ray powder diffraction which has at least the d-spacings set forth in Table B.

4. A process for preparing a crystalline molecular sieve having a three-dimensional microporous framework of $SiO_2$, $AlO_2$, and $PO_2$ tetrahedral units, having an intracrystalline pore system, an empirical formula expressed in molar ratios:

$$mR:(Si_xAl_yP_z)O_2$$

where R represents at least one organic templating agent present in the intracrystalline pore system; m is the molar amount of R per mole of $(Si_xAl_yP_z)O_2$ and has a value from zero to about 0.3; x is the mole fraction of silicon and varies from about 0.01 to about 0.98, y is the mole fraction of aluminum and varies from about 0.01 to about 0.60, z is the mole fraction of phosphorus and varies from about 0.01 to about 0.52 and $x+y+z=1$, and an x-ray diffraction pattern characteristic of SAPO-36; the process comprising forming a reaction mixture having a composition expressed by the formula:

$$aR:(Si_uAl_vP_w)O_2:bH_2O$$

where R is an organic templating agent selected from the group consisting of tripropylamine, dimethylbenzylamine, and tetrapropylammonium hydroxide; a has a value from greater than 0 to about 6; b has a value from 0 to 500, preferably 2 to 30; u is the mole fraction of silicon and varies from about 0.01 to about 0.98; v is the mole fraction of aluminum and varies from about 0.01 to about 0.98; w is the mole fraction of phosphorus and varies from about 0.01 to about 0.98; and reacting the mixture at a temperature of about 100° C. to about 250° C. under autogenous pressure for a time of about 2 hours to 2 weeks, thereby producing said crystalline molecular sieve.

5. The process of claim 4 where the organic templating agent is tripropylamine.

6. The process of claim 4 where the organic templating agent is dimethylbenzyl-amine.

7. The process of claim 4 where the organic templating agent is tetrapropyl-ammonium hydroxide.

8. A process for preparing a crystalline molecular sieve having a three-dimensional microporous framework of $SiO_2$, $Al_2$, and $PO_2$ tetrahedral units, having an intracrystalline pore system, an empirical formula expressed in molar ratios:

$$mR:(Si_xAl_yP_z)O_2$$

where R represents at least one organic templating agent present in the intracrystalline pore system; m is the molar amount of R per mole of $(Si_xAl_yP_z)O_2$ and has a value from zero to about 0.3; x is the mole fraction of silicon and varies from about 0.01 to about 0.98, y is the mole fraction of aluminum and varies from about 0.01 to about 0.60, z is the mole fraction of phosphorus and varies from about 0.01 to about 0.52 and $x+y+z=1$, and an x-ray diffraction pattern characteristic of SAPO-56; the process comprising forming a reaction mixture having a composition expressed by the formula:

$$aR:(Si_uAl_vP_w)O_2:bH_2O$$

where R is N,N,N'N'-tetramethylhexane-1,6-diamine; a has a value from greater than 0 to about 6; b has a value from 0 to 500, preferably 2 to 30; u is the mole fraction of silicon and varies from about 0.01 to about 0.98; v is the mole fraction of aluminum and varies from about 0.01 to about 0.98; w is the mole fraction of phosphorus and varies from about 0.01 to about 0.98; and reacting the mixture at a temperature of about 100° C. to about 250° C. under autogenous pressure for a time of about 2 hours to 2 weeks, thereby producing said crystalline molecular sieve.

* * * * *